United States Patent
Zimmermann et al.

(10) Patent No.: US 10,195,803 B2
(45) Date of Patent: Feb. 5, 2019

(54) DEVICE FOR PREHEATING AT LEAST ONE MOLD

(71) Applicant: Harburg-Freudenberger Maschinenbau GmbH, Hamburg (DE)

(72) Inventors: Arne Zimmermann, Deinste (DE); Rüdiger Meincke, Hamburg (DE)

(73) Assignee: HARBURG-FREUDENBERGER MASCHINENBAU GMBH, Hamburg (DE)

( * ) Notice: Subject to any disclaimer, the term of this patent is extended or adjusted under 35 U.S.C. 154(b) by 192 days.

(21) Appl. No.: 14/770,734

(22) PCT Filed: Feb. 5, 2014

(86) PCT No.: PCT/DE2014/000047
§ 371 (c)(1),
(2) Date: Aug. 26, 2015

(87) PCT Pub. No.: WO2014/131387
PCT Pub. Date: Sep. 4, 2014

(65) Prior Publication Data
US 2016/0009041 A1 Jan. 14, 2016

(30) Foreign Application Priority Data
Feb. 26, 2013 (DE) .................. 10 2013 003 479

(51) Int. Cl.
*B29D 30/06* (2006.01)
*B29C 35/04* (2006.01)

(52) U.S. Cl.
CPC ........ *B29D 30/0662* (2013.01); *B29C 35/049* (2013.01); *B29D 2030/067* (2013.01)

(58) Field of Classification Search
CPC .............. B29C 70/345; B29D 30/0601; B29D 30/0606; B29D 30/0629; B29D 30/0662; B29D 2030/0626; B29D 30/0005
See application file for complete search history.

(56) References Cited

U.S. PATENT DOCUMENTS 2,043,935 A * 6/1936 Stebbins ............ B29D 30/0662
285/108
3,783,241 A * 1/1974 Cimprich ........... B29D 30/0005
219/521

(Continued)

FOREIGN PATENT DOCUMENTS

EP 0638409 A1 2/1995
JP S5732931 A 2/1982
(Continued)

*Primary Examiner* — Gregory A Wilson
(74) *Attorney, Agent, or Firm* — Lucas & Mercanti, LLP; Klaus P. Stoffel

(57) ABSTRACT

The invention relates to a device for preheating at least one mold for a tire heating press, which has a coupling for applying a heating medium to the mold. The mold to be heated is enclosed by a receiving container (19), which is secured within a framework and creates the coupling for the heating medium. The device helps to provide effective preheating of the mold by an insulating shroud (2), which is positioned over the receiving container (19) during the preheating process and reduces heat dissipation into the surroundings.

8 Claims, 8 Drawing Sheets

(56) References Cited

U.S. PATENT DOCUMENTS

| | | | | |
|---|---|---|---|---|
| 4,647,273 A * | 3/1987 | Singh | ..................... | B30B 15/041 100/193 |
| 4,804,318 A * | 2/1989 | Fujieda | ................. | B29C 33/202 425/34.1 |
| 4,927,344 A * | 5/1990 | Amano | ............... | B29D 30/0601 277/641 |
| 5,165,939 A * | 11/1992 | Pizzorno | ............... | B29C 33/305 425/195 |
| 5,271,727 A * | 12/1993 | Irie | ....................... | B29C 31/006 425/34.1 |
| 5,622,669 A | 4/1997 | Dailliez et al. | | |
| 5,681,594 A * | 10/1997 | Irie | ....................... | B29C 31/006 425/28.1 |
| 6,547,548 B1 * | 4/2003 | Irie | .................... | B29D 30/0601 425/34.1 |
| 6,620,367 B1 * | 9/2003 | Mitamura | ........... | B29C 35/0266 264/294 |
| 6,818,872 B2 * | 11/2004 | Mitamura | ........... | B29C 35/0272 219/635 |
| 9,278,494 B2 * | 3/2016 | Anderson | .......... | B29D 30/0605 |
| 9,314,975 B1 * | 4/2016 | Matsen | ................. | B29C 51/421 |
| 9,346,228 B2 * | 5/2016 | Singh | ................. | B29D 30/0605 |
| 9,446,561 B2 * | 9/2016 | Singh | ................. | B29D 30/0601 |
| 2002/0015746 A1 * | 2/2002 | Mitamura | ........... | B29C 35/0272 425/50 |
| 2012/0223463 A1 * | 9/2012 | Kovac | ................ | B29D 30/0601 264/501 |

FOREIGN PATENT DOCUMENTS

| | | |
|---|---|---|
| JP | H0513709 U | 2/1993 |
| JP | H0671651 A | 3/1994 |
| JP | H1158388 A | 3/1999 |
| WO | 2007013113 A1 | 2/2007 |

\* cited by examiner

DEVICE FOR PREHEATING AT LEAST ONE MOLD

The present application is a 371 of International application PCT/DE2014/000047, filed Feb. 5, 2014, which claims priority of DE 10 2013 003 479.5, filed Feb. 26, 2013, the priority of these applications is hereby claimed and these applications are incorporated herein by reference.

BACKGROUND OF THE INVENTION

The invention pertains to a device for preheating at least one mold for a tire heating press, which device comprises a coupling for supplying the mold with a heating medium.

It is already known that molds for tire heating presses can be preheated prior to being arranged in the area of the tire heating press. The rate at which the heating press is operated can thus be considerably increased. A cycle time of two hours is typically reduced to a period of 30 minutes or so.

According to a known method, a heating jacket of the mold is connected to a source of superheated steam by means of a hose connection. The superheated steam flowing through the heating jacket of the mold thus heats the mold.

A method of this type is problematic for reasons of occupational safety, for example, because the mold is freely accessible from the outside while the preheating is being carried out, and also because in particular the hose must be disconnected from the hot mold. The work steps to be performed also require a corresponding amount of effort.

SUMMARY OF THE INVENTION

The goal of the present invention is to construct a device of the type described above in such a way that handling is simplified.

This goal is achieved according to the invention in that a receiving container to hold the mold is mounted in a stand, and in that an insulating shroud is arranged so that it can be positioned relative to the container.

The device according to the invention makes it possible to arrange the mold to be heated inside the container. After the necessary connections have been made, the insulating shroud can be lowered and will enclose the receiving container containing the mold. As a result, both unintended contact with the container and/or the mold is avoided, and unwanted loss of heat through radiation is also prevented.

The device according to the invention thus makes it possible to preheat quickly; it also saves energy and increases work safety.

According to a preferred embodiment, the mold is set down onto a heating plate inside the container. It is also possible to connect the heating jacket of the mold directly to a source of superheated steam.

According to a preferred embodiment, an automatic coupling is used to make the connection to the source of superheated steam. It is also preferred to use a temperature control unit to keep the temperature of the mold at the exact temperature desired.

The heating plate is typically heated with steam. The receiving container can also be heated with steam. Flow channels are preferably provided in each case, through which the superheated steam is conducted. The steam can be conducted around a circuit.

Preferably a pneumatic system is used to position the insulating shroud. Control valves for the superheated steam can be arranged underneath the receiving container. The control valves can be arranged as a valve battery. It is possible, through the use of hydraulic or pneumatic linear drives, to foresee the insulating shroud in a controlled manner.

To support low-cost construction, the pneumatic system is not, according to the invention, used for the controlled lowering step. Instead, the insulating shroud is lowered in a controlled manner by its own weight and in opposition to an adjustable pneumatic resistance.

The movement into the open position is carried out by the pneumatic system operating in power-controlled mode. This means that the linear movement into the closed position takes place without the use of energy, i.e., simply by the intrinsic weight of the insulating shroud acting against the pneumatic resistance; energy is expended only to move the shroud into the open position.

Exemplary embodiments of the invention are illustrated schematically in the drawings:

DETAILED DESCRIPTION OF THE INVENTION

Figure 1:
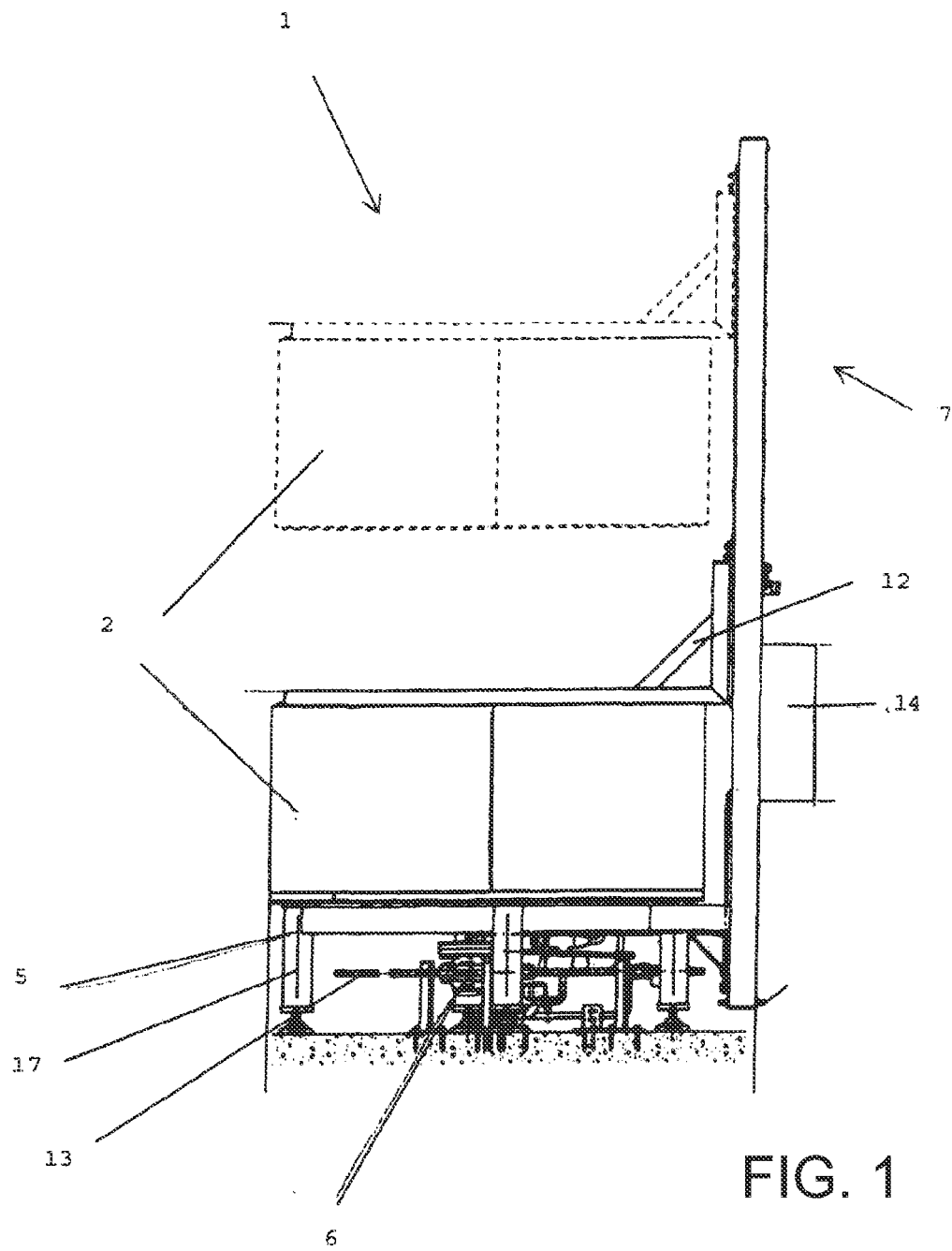
FIG. 1 shows a side view of the preheating device 1 with a lowered insulating shroud 2 and, in broken line, with a raised insulating shroud.

FIG. 1 shows a side view of the preheating device 1 in a first position with a lowered insulating shroud 2 and, in broken line, with a raised insulating shroud 2. In the lowered first position, the insulating shroud 2 surrounds the receiving container containing the mold and the heating plate 3. In principle, the heating plate 3 is an integral part of the receiving container 19. The heating plate can also be arranged as a component within the device 1, onto which the receiving container 19 is set.

The lifting mechanism 7 is controlled by a control unit 14 and comprises essentially a lifting frame 8 and a drive 11. The drive 11 is preferably formed by a linear pneumatic drive. This pneumatic drive is controlled by the control unit 14 and moves the insulating shroud 2 in a power-controlled operating mode from the lower into the upper position.

The linear movement from the upper (open) position to the lower (closed) position is not initialized by pneumatic power; instead, the insulating shroud 2 is moved from the upper position to the lower position by the force of gravity acting against the pneumatic resistance of the drive 11. This means that the speed at which the insulating shroud 2 descends is determined by the preset pneumatic resistance, which is a function of the force of gravity acting on the insulating shroud 2 in question.

The preheating device 1 consists basically of a stand 5, which holds the structural components. The heater 6 and other media-supply elements (not shown) are arranged together in the lower area of the stand 5. The insulating shroud 2 is coupled movably to the lifting mechanism 7 by a support device 12.

The support mechanism 12 can be moved by the lifting mechanism 7 in linear fashion between the open position and the closed position, and as an option, it can also bring about a pivoting movement, either in addition to or instead of the linear movement. If the support device 12 enables a pivoting movement, it is configured in such a way that a suitable rotary joint or a slide block moving along a guide is provided at the coupling point to the lifting mechanism 7.

Figure 2:
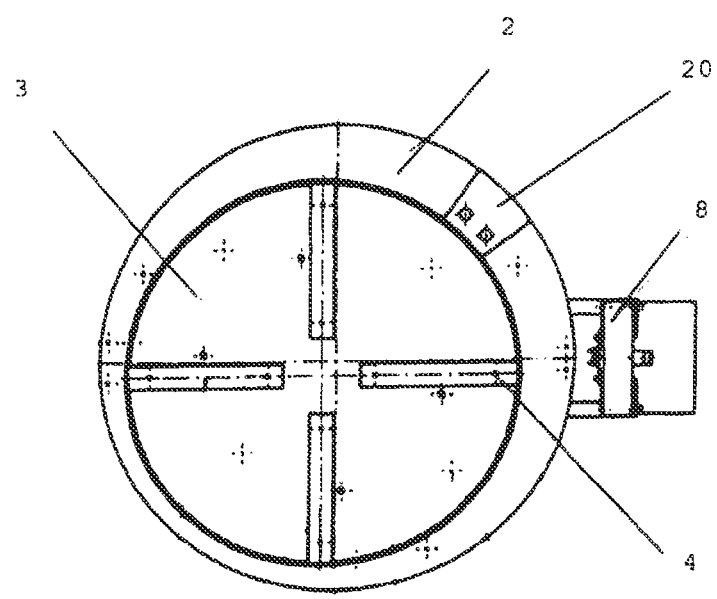
FIG. 2 shows a top view of the arrangement according to FIG. 1, wherein parts of the lifting mechanism 7 have been omitted.

FIG. 2 shows a top view of the arrangement according to FIG. 1, wherein the support device 12 is not shown. The external contours of the insulating shroud 2 are shown; it is arranged axially in the preheating device 1 in such a way that the heating plate 3 and the insulating plate 4 are concentric to each other inside the insulating shroud 2 when the shroud is in the closed position.

Figure 3:
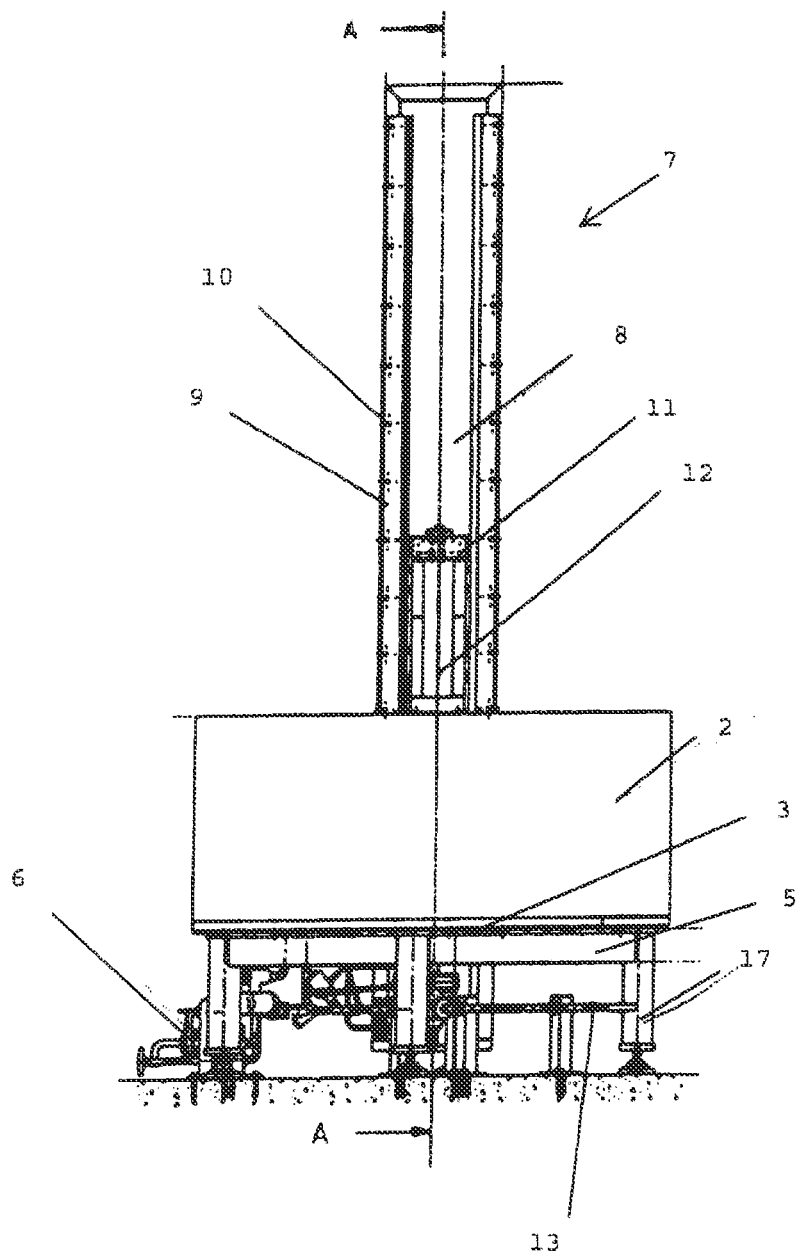
FIG. 3 shows a front view of the device 1 according to FIG. 1 with a lowered insulating shroud 2.

FIG. 3 shows a front view of the device according to FIG. 1 with a lowered insulating shroud 2. The heating plate 3 is preferably heated with steam, especially superheated steam. The receiving container 19 for the mold to be preheated can also be heated with steam. The device 1 according to the invention supports this embodiment in particular, because the receiving container 19 and the heating plate 3 are preferably configured as structural elements.

Flow channels are preferably used inside the various device components to be heated; the superheated steam is conducted through these channels. The steam can be conducted around a circuit. The heater 6 and the superheated steam supply lines in the form of heating lines 13 are arranged in the area of the stand 5. Depending on the supply method which is realized, the components 3, 19 to be heated can be piped independently of each other or connected to a common pipeline circuit.

The receiving container 19 with the mold to be heated arranged inside the insulating shroud 2 is not visible here; it is resting directly on the heating plate 3. The insulating shroud 2 is coupled to the support device 12 and can be moved in linear fashion by the lifting mechanism 7. The lifting mechanism is formed essentially by the lifting frame 8, the linear guides 9, and the drive 11, which are connected to each other by suitable assembly means 10. The drive 11 is preferably a pneumatic linear-acting cylinder, which realizes the motive power necessary to open the device 1 and which makes possible the controlled lowering from the open position to the closed position by adjustment of the pneumatic resistance acting against the force of gravity acting on the insulating shroud 2.

Figure 4:
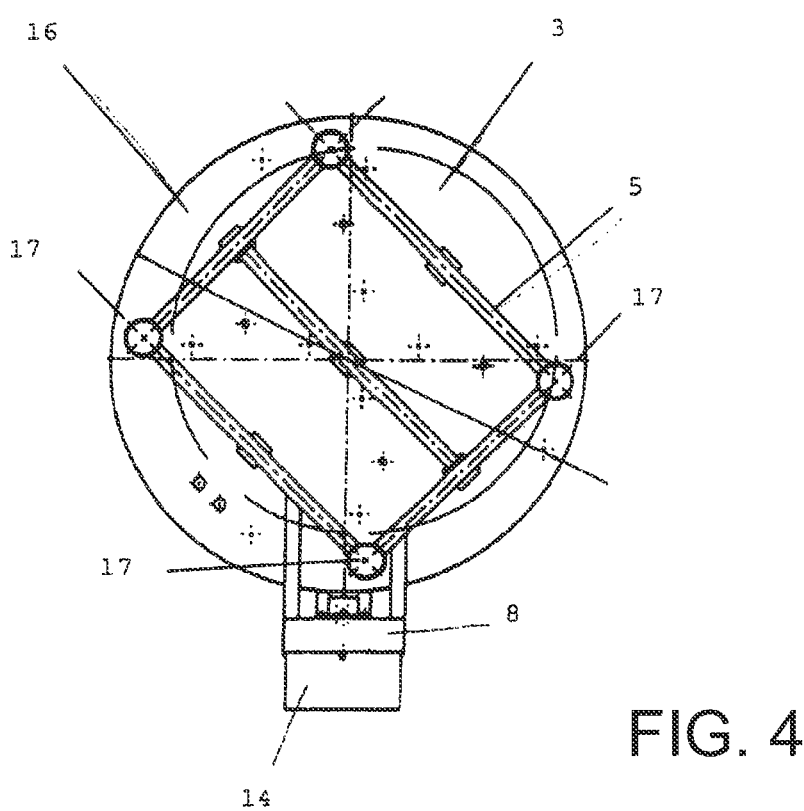
FIG. 4 shows a view of the device 1 according to FIG. 3 from underneath.

FIG. 4 shows a view of the device 1 according to FIG. 3 from underneath. What is shown is the stand 5 without the media-supply devices such as the heating lines 13 or the heater 6. The stand 5 with its longitudinal and transverse struts and the support feet 17 at the corners of the stand 5 is arranged and oriented in such a way that it is not aligned with the lifting mechanism 7.

The rotation of the stand 5 relative to the lifting frame has essentially two reasons. First, the mounting of the lifting frame 8 at a right angle to the stand and in the immediate vicinity of one of the support feet 17 of the stand gives the structure improved strength and stability. In addition, it also results in a more favorable distribution of the load exerted on the stand 5 by the heating plate 3, which is indicated schematically by the broken line, and by the receiving container 19 containing the mold to be heated (not shown), which rests on it.

Because of the off-center arrangement of the heating plate 3 and thus of the position of the receiving container 19 to be set down onto it (in cases where a two-part design is used), all of the steam supply lines 20 for the receiving container 19, which are attached to the side of the receiving container 19 (not shown), can be accommodated inside the insulating shroud 2. Logically, the same situation is present when the receiving container 19 comprises the heating plate 3 as an integral component. The heating plate 3 is surrounded by a concentric ring of insulating material 16.

Because the center of gravity of the overall structure is shifted off-center, the load to be supported by the support feet 17 is distributed more uniformly. The selected rectangular shape of the stand 5 supports this uniform load distribution. Preferably, and as a function of the configuration of the offset of the heating plate 3 from the center, the stand can be positioned at an angle of approximately 45° from that in which it is aligned with the lifting frame 8.

Figure 5:
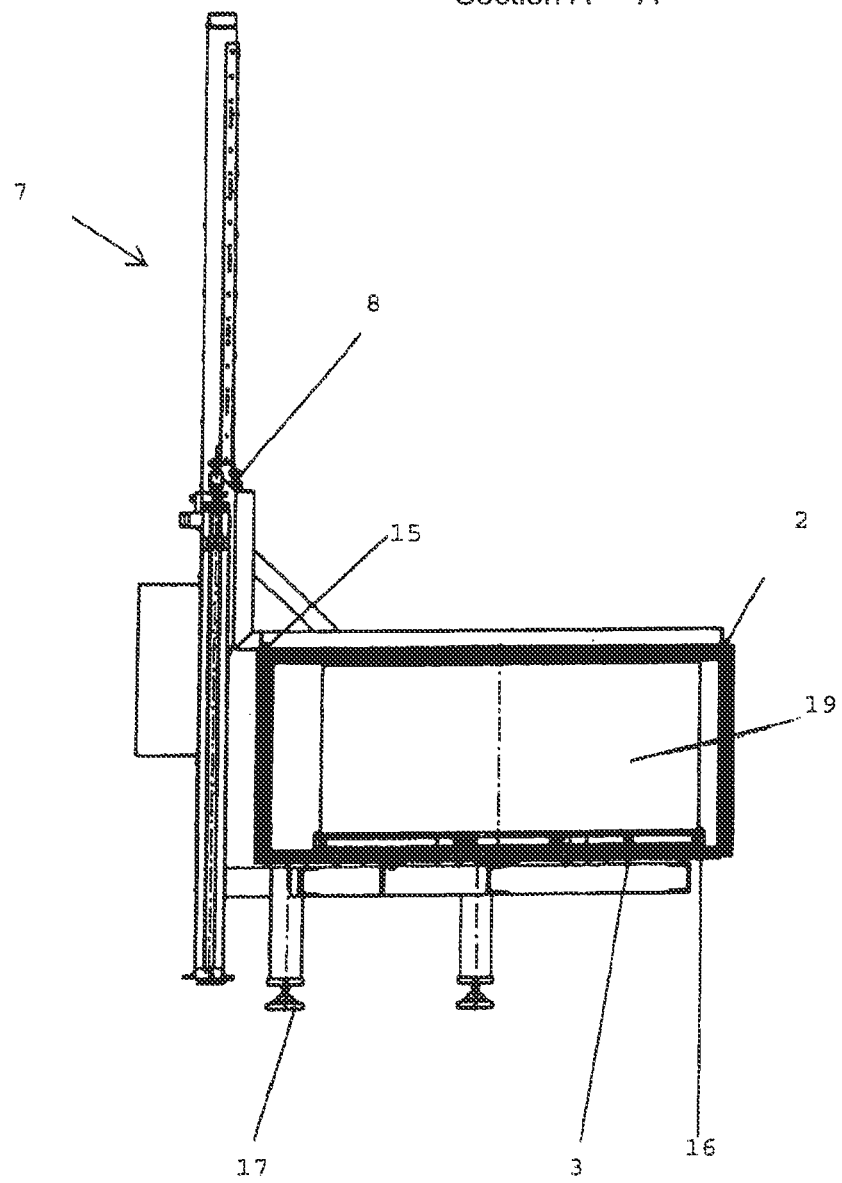
FIG. 5 shows a cross-sectional view of the device 1 with a lowered insulating shroud 2 along line A-A of FIG. 3.

FIG. 5 shows a cross section of the device 1 with a lowered insulating shroud 2 along line A-A of FIG. 3. Inside the insulating shroud 2, the receiving container 19 is sketched, which has been set down onto the heating plate 3 or onto the stand 5 before the insulating shroud 2 is moved into the closed position. When the insulating shroud 2 is in the closed position, the heating plate 3 is surrounded by insulating material 16 in the shape of a concentric ring.

Figure 6:
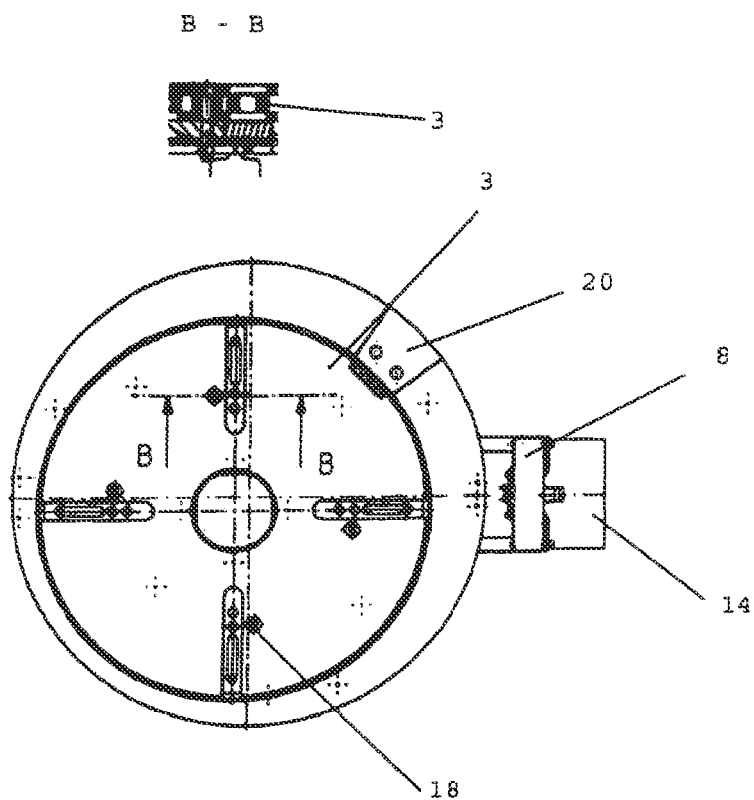
FIG. 6 shows a top view of the arrangement according to FIG. 5.

FIG. 6 shows a top view of the arrangement according to FIG. 5 and a partial cross section of the heating plate 3 in the area of the heating plate attachment 18.

Figure 7:
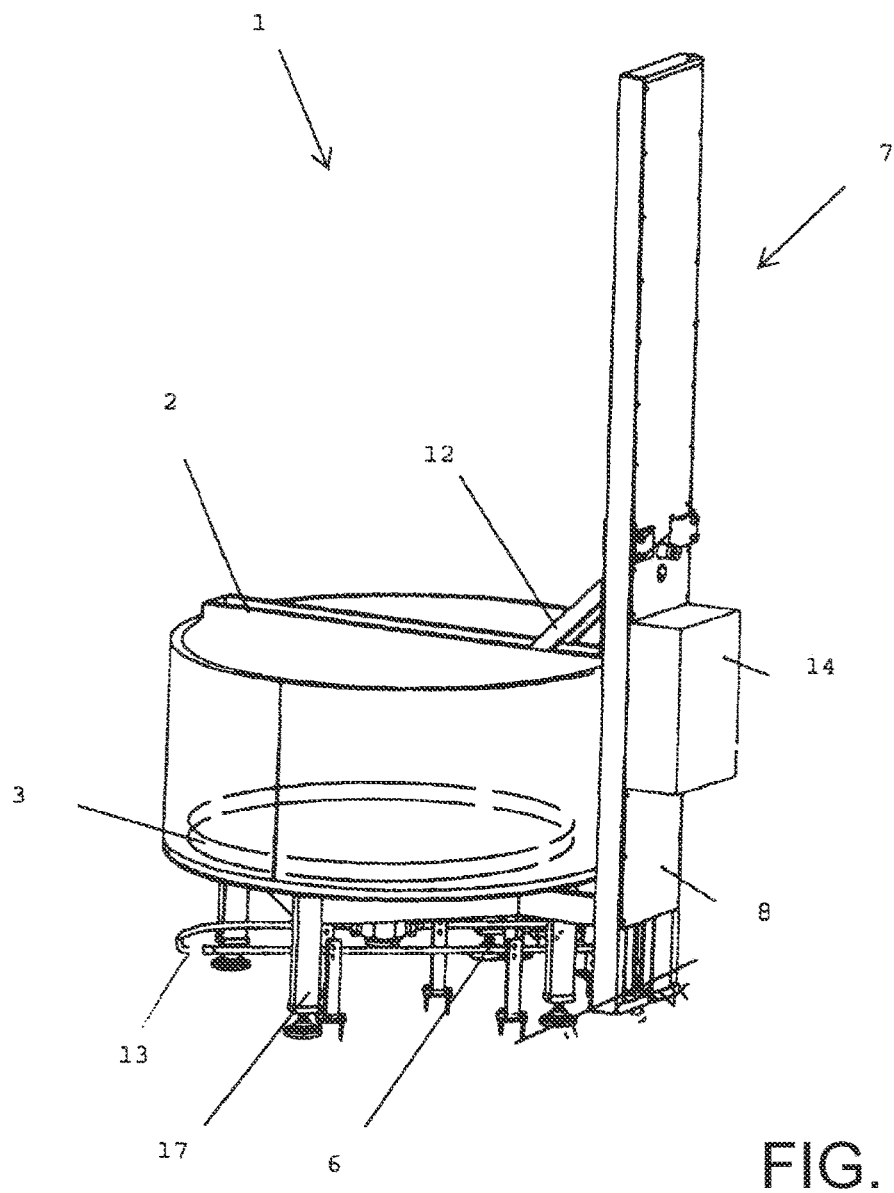
FIG. 7 shows a perspective view of the device 1 with a lowered insulating shroud 2.

FIG. 7 shows a perspective diagram of the device 1 with a lowered insulating shroud 2. The control unit 14 is mounted on the rear side of the lifting frame 8. A heating line 13, preferably a superheated steam line, is provided to heat the heating plate 3 and/or the receiving container 19 to preheat the mold in the interior of the receiving container 19 to the desired temperature. For supplying the heating plate 3 and the receiving container 19 with heat energy from the heater 6 of the preheating device 1, either a parallel connection (each component supplied individually) or a series connection (all components in a circuit) of the heating medium can be realized.

The heating medium is preferably steam or superheated steam. Electrical resistance heaters or other heat-producing principles are also possible; there is no limitation in this respect from a structural standpoint. The advantage of heating with superheated steam is that it can be provided at low cost when a large number of units to be heated can be supplied from a boiler house, as is the case with tire production.

Figure 8:
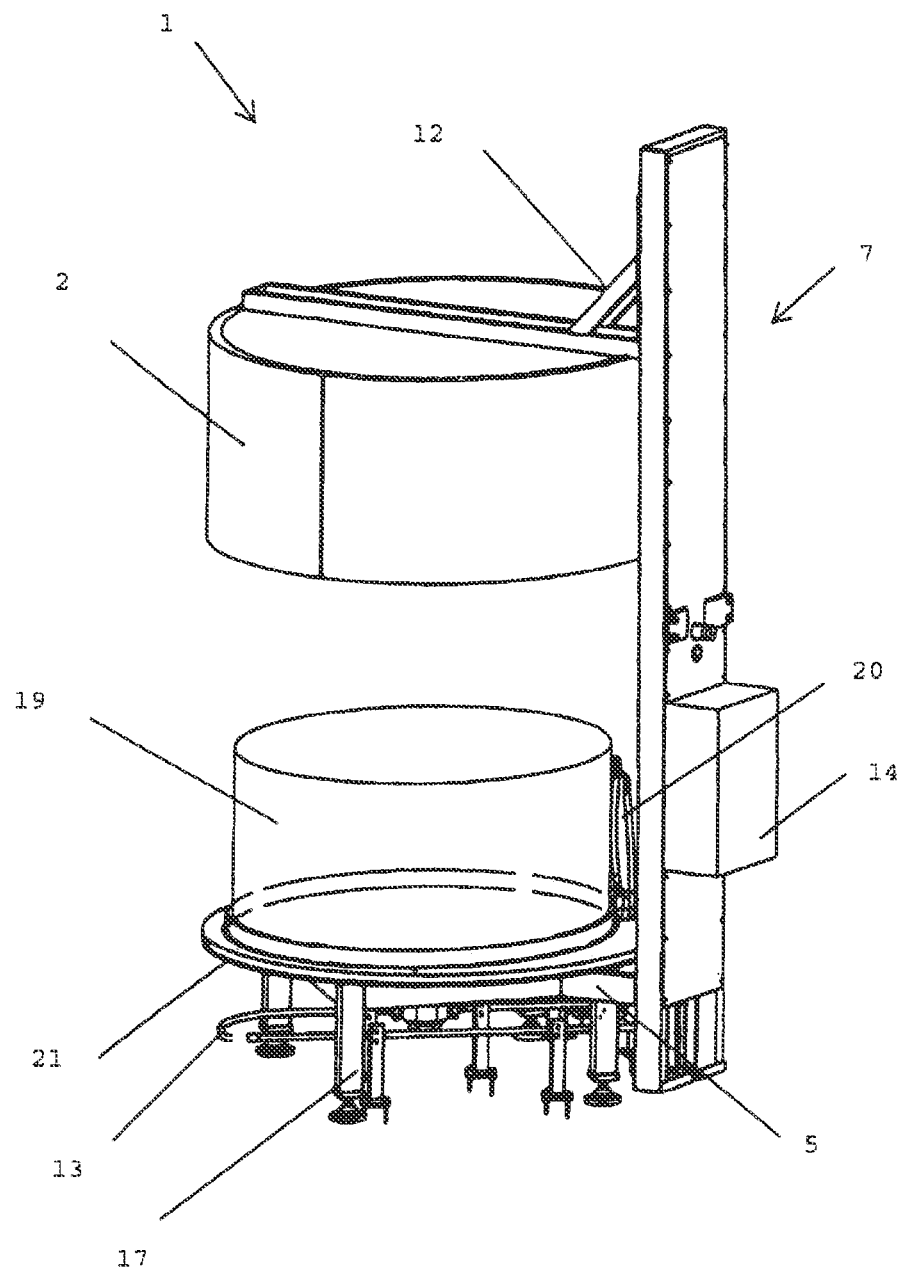
FIG. 8 shows a perspective view of the device 1 with an opened insulating shroud 2.

FIG. 8 shows a perspective view of the device 1 with an open insulating shroud 2. The device 1 in FIG. 8 is configured with a plate 21, which offers a support surface for the receiving container 19. Alternatively, the receiving container 19 can be set down directly on the stand 5. If the heating plate 3 is not an integral component of the device 1, it can, like the plate 21 shown here, be arranged inside the device 1.

The receiving container 19 has steam supply lines 20 on its side. As a result of the concentric positioning of the insulating shroud 3 and the receiving container 19 to each other, it is possible for the insulating shroud to be positioned over the receiving container 19 with the steam supply lines 20.

The invention claimed is:

1. A device for preheating at least one mold of a tire heating press, comprising: a coupling for supplying the mold with a heating medium; a stand; a receiving container to contain the mold is mounted on the stand; an insulating shroud is arranged so as to be positionable relative to the receiving container; and at least one heating plate for heating the receiving container, wherein the insulating shroud is movable in a vertical direction, further comprising a lifting mechanism comprising a pneumatic drive with adjustable resistance for lowering the insulating shroud in a controlled manner.

2. The device according to claim 1, further comprising a superheated steam source connected to the receiving container and/or the heating plate.

3. The device according to claim 2, further comprising an automatic coupling that connects the steam source to the receiving container and/or the heating plate when the receiving container is introduced into the device.

4. The device according to claim 1, wherein the insulating shroud is a container open at one end so as to be placeable over the receiving container.

5. The device according to claim 2, wherein the insulating shroud comprises a concentric ring at the open end.

6. The device according to claim 2, wherein the insulating shroud is made of an insulating material.

7. The device according to claim 1, wherein the lifting mechanism includes a lifting frame attached to the stand at a right angle.

8. A device for preheating at least one mold of a tire heating press, comprising: a coupling for supplying the mold with a heating medium; a stand; a receiving container to contain the mold is mounted on the stand; and an insulating shroud is arranged so as to be positionable relative to the receiving container, wherein the positioning of the receiving container is supported inside the device and off-center relative to the insulating shroud.

\* \* \* \* \*